United States Patent
Fattal (10) Patent No.: US 11,232,729 B2
(45) Date of Patent: Jan. 25, 2022

(54) MULTIVIEW DISPLAY AND METHOD WITH OFFSET ROWS OF MULTIBEAM EMITTERS AND MULTIVIEW PIXELS

(71) Applicant: LEIA INC., Menlo Park, CA (US)

(72) Inventor: David A. Fattal, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/206,039

(22) Filed: Mar. 18, 2021

(65) Prior Publication Data

US 2021/0209980 A1 Jul. 8, 2021

Related U.S. Application Data (63) Continuation of application No. PCT/US2018/053817, filed on Oct. 1, 2018.

(51) Int. Cl.
*G09G 3/02* (2006.01)
*G09G 3/34* (2006.01)
(Continued)

(52) U.S. Cl.
CPC .......... *G09G 3/02* (2013.01); *G02B 6/005* (2013.01); *G09G 3/342* (2013.01); *G09G 3/3614* (2013.01);
(Continued)

(58) Field of Classification Search
CPC ........ G09G 3/02; G09G 3/342; G09G 3/3614; G09G 2300/0469; G09G 2320/0247;
(Continued)

(56) References Cited

U.S. PATENT DOCUMENTS 5,521,724 A * 5/1996 Shires ............... G02B 5/32
359/15
5,689,283 A * 11/1997 Shirochi ........... C03B 37/01486
345/213
(Continued)

FOREIGN PATENT DOCUMENTS

KR 10-2012-0034581 A 12/2012
KR 10-1375850 B1 2/2014
(Continued)

OTHER PUBLICATIONS

International Search Report and Written Opinion (ISRWO) by International Searching Authority (ISA) Korean Intellectual Property Office (KIPO) dated Jun. 26, 2019 (9 pages) for foreign counterpart PCT Application No. PCT/US2018/053817.
(Continued)

*Primary Examiner* — Michael J Jansen, II
(74) *Attorney, Agent, or Firm* — J. Michael Johnson (57) ABSTRACT

A multiview display and method employ light valves configured to be driven according to a polarity inversion protocol along with multibeam emitters arranged in offset rows. The multiview display includes an array of the multiview pixels comprising the light valves and a multibeam backlight having a plurality of the multibeam emitters arranged in the offset rows. A method of multiview display operation includes emitting directional light beams using an array of multibeam elements in offset rows and modulating the directional light beams using an array of light valves to display an image. Sets of light valves of the light valve array correspond to multiview pixels of the multiview display and the light valve array is driven according to a polarity inversion protocol. In both the multiview display and the method, adjacent offset rows are offset by a distance
(Continued)

between repeating polarities of the plurality inversion protocol in a row direction.

21 Claims, 5 Drawing Sheets

(51) Int. Cl.
 *G09G 3/36* (2006.01)
 *F21V 8/00* (2006.01)
(52) U.S. Cl.
 CPC .............. *G09G 2300/0469* (2013.01); *G09G 2320/0247* (2013.01); *G09G 2320/068* (2013.01)
(58) Field of Classification Search
 CPC ....... G09G 2320/068; G09G 2320/028; G09G 3/003; G09G 3/34; G09G 3/3406; G09G 5/14; G09G 2300/0823; G02B 6/005; H04N 13/351; H04N 13/307
 See application file for complete search history.

(56) References Cited

U.S. PATENT DOCUMENTS

| | | | | |
|---|---|---|---|---|
| 6,400,394 | B1* | 6/2002 | Kim | G02B 30/25 348/51 |
| 6,768,482 | B2* | 7/2004 | Asano | H01L 27/3211 345/90 |
| 7,042,527 | B2* | 5/2006 | Imai | H04N 9/3114 348/273 |
| 7,446,733 | B1* | 11/2008 | Hirimai | G03B 35/18 345/32 |
| 9,128,226 | B2* | 9/2015 | Fattal | G02B 30/27 |
| 9,161,408 | B2* | 10/2015 | Messmer | G09G 3/3426 |
| 9,201,270 | B2 | 12/2015 | Fattal et al. | |
| 9,298,168 | B2 | 3/2016 | Taff et al. | |
| 9,389,415 | B2 | 7/2016 | Fattal et al. | |
| 9,459,461 | B2 | 10/2016 | Santori et al. | |
| 9,557,466 | B2* | 1/2017 | Fattal | G02B 6/0068 |
| 9,716,877 | B2* | 7/2017 | Kang | G02B 30/31 |
| 9,785,119 | B2 | 10/2017 | Taff et al. | |
| 10,120,198 | B2* | 11/2018 | Santori | G02B 27/4205 |
| 10,345,505 | B2 | 7/2019 | Fattal | |
| 10,373,544 | B1* | 8/2019 | Fattal | G09G 3/2096 |
| 10,412,363 | B1* | 9/2019 | Burnett, III | H04N 9/04519 |
| 10,551,546 | B2* | 2/2020 | Fattal | G02B 30/33 |
| 10,649,128 | B2* | 5/2020 | Fattal | G02B 6/0036 |
| 10,728,533 | B2 | 7/2020 | Fattal | |
| 10,798,371 | B2 | 10/2020 | Fattal | |
| 10,810,917 | B2* | 10/2020 | Fattal | G02F 1/133606 |
| 10,830,939 | B2* | 11/2020 | Fattal | G02B 6/005 |
| 10,838,134 | B2 | 11/2020 | Fattal et al. | |
| 10,852,560 | B2* | 12/2020 | Fattal | G02B 6/0036 |
| 10,884,175 | B2 | 1/2021 | Fattal | |
| 10,901,212 | B2* | 1/2021 | Fattal | G02B 6/0038 |
| 10,928,677 | B2* | 2/2021 | Aieta | G02B 6/0036 |
| 10,930,188 | B2* | 2/2021 | Blank | G11C 19/28 |
| 10,937,348 | B2* | 3/2021 | Blank | G09G 3/025 |
| 10,969,627 | B2* | 4/2021 | Fattal | G02F 1/133606 |
| 10,989,961 | B2* | 4/2021 | Kim | G02F 1/133603 |
| 11,004,407 | B2* | 5/2021 | Fattal | H04N 13/324 |
| 11,011,121 | B2* | 5/2021 | Fattal | H04N 13/356 |
| 11,016,235 | B2* | 5/2021 | Fattal | G02B 6/0036 |
| 11,016,238 | B2* | 5/2021 | Fattal | H01L 33/60 |
| 11,041,988 | B2* | 6/2021 | Fattal | G02B 6/0035 |
| 2002/0024618 | A1* | 2/2002 | Imai | G09G 3/3413 348/743 |
| 2012/0162968 | A1* | 6/2012 | Messmer | H05B 45/10 362/97.1 |
| 2012/0169688 | A1* | 7/2012 | Chen | G09G 3/003 345/209 |
| 2012/0249934 | A1* | 10/2012 | Li | G02B 5/1819 349/96 |
| 2012/0268481 | A1* | 10/2012 | Niioka | G02B 30/30 345/619 |
| 2013/0169518 | A1 | 7/2013 | Wu et al. | |
| 2015/0036068 | A1* | 2/2015 | Fattal | G02B 6/005 349/15 |
| 2015/0279293 | A1 | 10/2015 | Missbach et al. | |
| 2016/0033705 | A1* | 2/2016 | Fattal | G02B 5/1866 349/15 |
| 2017/0085867 | A1 | 3/2017 | Baran et al. | |
| 2017/0090096 | A1* | 3/2017 | Fattal | G02B 27/425 |
| 2017/0192158 | A1* | 7/2017 | Lee | G02B 6/0036 |
| 2017/0299793 | A1* | 10/2017 | Fattal | G02F 1/292 |
| 2017/0329149 | A1* | 11/2017 | Fattal | G02B 30/27 |
| 2017/0363794 | A1 | 12/2017 | Wan et al. | |
| 2018/0011237 | A1* | 1/2018 | Fattal | H04N 13/315 |
| 2018/0024289 | A1* | 1/2018 | Fattal | G02B 6/0038 362/601 |
| 2018/0067251 | A1* | 3/2018 | Baldwin | G02B 6/0068 |
| 2018/0156963 | A1* | 6/2018 | Fattal | G09G 3/003 |
| 2018/0172893 | A1* | 6/2018 | Fattal | G02B 6/0035 |
| 2018/0188441 | A1* | 7/2018 | Fattal | G02B 6/0038 |
| 2018/0188691 | A1* | 7/2018 | Fattal | G02B 6/0068 |
| 2018/0196194 | A1* | 7/2018 | Fattal | G02F 1/1335 |
| 2018/0246330 | A1 | 8/2018 | Fattal | |
| 2018/0278923 | A1* | 9/2018 | Fattal | G02B 6/005 |
| 2018/0299608 | A1* | 10/2018 | Fattal | H04N 13/302 |
| 2018/0306965 | A1* | 10/2018 | Fattal | G02B 6/0036 |
| 2019/0018186 | A1* | 1/2019 | Fattal | G02F 1/133602 |
| 2019/0025494 | A1* | 1/2019 | Fattal | G02B 30/33 |
| 2019/0155105 | A1* | 5/2019 | Aieta | G02F 1/133615 |
| 2019/0156720 | A1* | 5/2019 | Blank | G11C 19/30 |
| 2019/0156721 | A1* | 5/2019 | Blank | G11C 19/30 |
| 2019/0302336 | A1* | 10/2019 | Fattal | G02B 6/0035 |
| 2019/0339452 | A1* | 11/2019 | Fattal | G02B 30/33 |
| 2020/0005718 | A1* | 1/2020 | Fattal | G02F 1/1323 |
| 2020/0018886 | A1* | 1/2020 | Fattal | G02B 6/0036 |
| 2020/0018891 | A1* | 1/2020 | Fattal | G02B 6/0091 |
| 2020/0025993 | A1* | 1/2020 | Fattal | G02B 6/0036 |
| 2020/0033621 | A1* | 1/2020 | Fattal | G02B 30/33 |
| 2020/0051513 | A1* | 2/2020 | Fattal | G02B 30/33 |
| 2020/0059639 | A1* | 2/2020 | Fattal | H04N 13/315 |
| 2021/0033790 | A1* | 2/2021 | Ward | G02B 30/28 |
| 2021/0041718 | A1* | 2/2021 | Balogh | G09G 3/32 |
| 2021/0176453 | A1* | 6/2021 | Fattal | G02B 6/0036 |
| 2021/0209918 | A1* | 7/2021 | Fattal | G09G 3/3614 |
| 2021/0200807 | A1 | 8/2021 | Wei et al. | |
| 2021/0239895 | A1* | 8/2021 | Fattal | G02B 30/33 |
| 2021/0255476 | A1* | 8/2021 | Fattal | G02B 5/201 |

FOREIGN PATENT DOCUMENTS

| | | |
|---|---|---|
| WO | 2012038856 A1 | 3/2012 |
| WO | 2018140063 A1 | 8/2018 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

(56) References Cited

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

* cited by examiner

MULTIVIEW DISPLAY AND METHOD WITH OFFSET ROWS OF MULTIBEAM EMITTERS AND MULTIVIEW PIXELS

CROSS-REFERENCE TO RELATED APPLICATIONS

This application is a continuation application of and claims the benefit of priority to prior International Application No. PCT/US2018/053817, filed Oct. 1, 2018, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light include LCDs and EP displays.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting employing multibeam emitters and multiview pixels arranged in offset rows with application to multiview displays. In various embodiments consistent with the principles herein, a multiview display is provided having an array of multiview pixels comprising light valves driven according to a polarity inversion protocol. The multiview display further comprises a multibeam backlight having a plurality of multibeam emitters arranged in rows and corresponding to the multiview pixels. Rows of multibeam emitters are offset from one another by a distance between repeating polarities of the polarity inversion protocol. The offset is configured to mitigate and in some examples even eliminate brightness flicker within multiview images displayed by the multiview display that may be associated with the polarity inversion protocol, according to various embodiments. In particular, embodiments of the multiview display may employ the offset to insure that adjacent image pixels in a view of a multiview image are provided by light valves of the multiview display driven with different (e.g., opposite) polarities according to the polarity inversion protocol in order to reduce or eliminate brightness flicker.

Herein a 'two-dimensional display' or '2D display' is defined as a display configured to provide a view of an image that is substantially the same regardless of a direction from which the image is viewed (i.e., within a predefined viewing angle or viewing range of the 2D display). A liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. In some instances, a multiview display may also be referred to as a three-dimensional (3D) display, e.g., when simultaneously viewing two different views of the multiview image provides a perception of viewing a three-dimensional image (3D image).

Figure 1A:
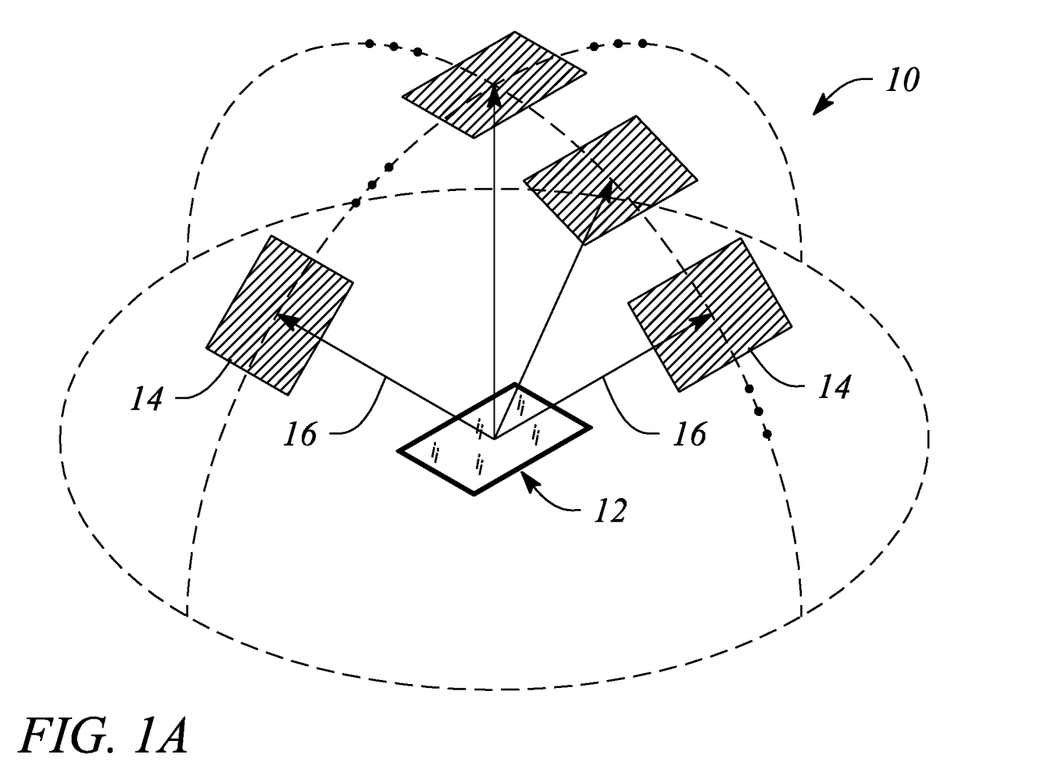
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta,\varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\varphi$ is an angle in a horizontal plane (e.g., parallel to the multiview display screen plane).

Figure 1B:
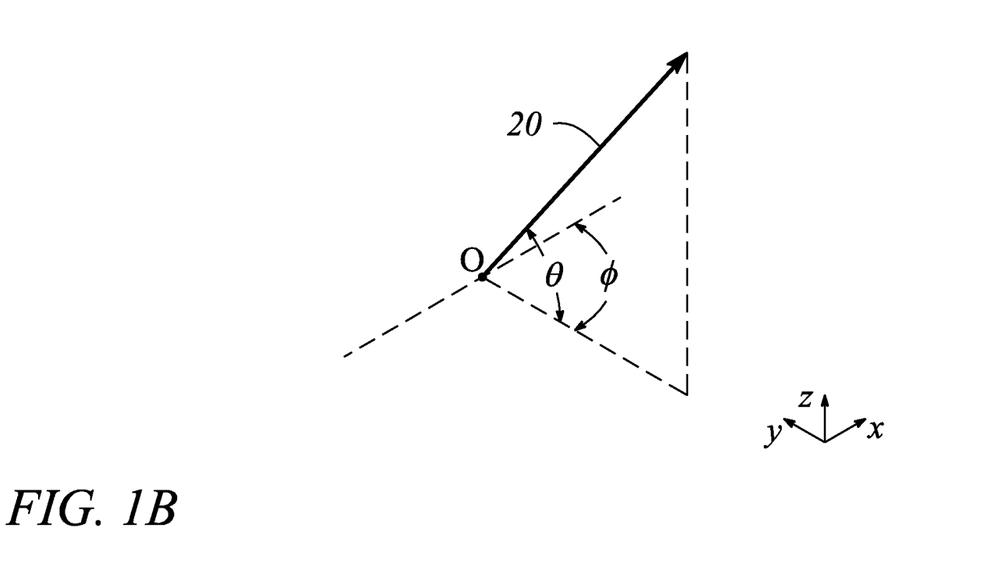
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta,\varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels representing 'view' pixels in each of a similar plurality of different views of a multiview display. In particular, a multiview pixel may have an individual pixel or set of pixels corresponding to or representing a view pixel in each of the different views of the multiview image. By definition herein therefore, a 'view pixel' is a pixel or set of pixels corresponding to a view in a multiview pixel of a multiview display. In some embodiments, a view pixel may include one or more color sub-pixels. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels a multiview pixel may have equivalent or at least substantially similar locations or coordinates in each of the different views. For example, a first multiview pixel may have individual view pixels located at $\{x_1, y_1\}$ in each of the different views of a multiview image, while a second multiview pixel may have individual view pixels located at $\{x_2, y_2\}$ in each of the different views, and so on.

In some embodiments, a number of view pixels in a multiview pixel may be equal to a number of views of the multiview display. For example, the multiview pixel may provide sixty-four (64) view pixels associated with a multiview display having 64 different views. In another example, the multiview display may provide an eight by four array of views (i.e., 32 views) and the multiview pixel may include thirty-two 32 view pixels (i.e., one for each view). Additionally, each different view pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of view pixels (i.e., pixels that make up a selected view) in the multiview display views each view of the multiview display. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

By definition herein, a 'multibeam emitter' is a structure or element of a backlight or a display that produces light that includes a plurality of light beams. In some embodiments, the multibeam emitter may be optically coupled to a light guide of a backlight to provide the light beams by coupling out a portion of light guided in the light guide. In such embodiments, a multibeam emitter may comprise a 'multibeam element.' In other embodiments, the multibeam emitter may generate light emitted as the light beams (i.e., may comprise a light source). Further, the light beams of the plurality of light beams produced by a multibeam emitter have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field. According to various embodiments, the different principal angular directions of the various light beams are determined by a characteristic including, but not limited to, a size (e.g., length, width, area, etc.) of the multibeam emitter. In some embodiments, the multibeam emitter may be considered an 'extended point light source', i.e., a plurality of point light sources distributed across an extent of the multibeam emitter, by definition herein. Further, a light beam produced by the multibeam emitter has a principal angular direction given by angular components $\{\theta, \phi\}$, by definition herein, and as described above with respect to FIG. 1B.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., $>\pm20°$). In other embodiments, the broad-angle emitted light cone angle may be greater than about thirty degrees (e.g., $>\pm30°$), or greater than about forty degrees (e.g., $>\pm40°$), or greater than fifty degrees (e.g., $>\pm50°$). For example, the cone angle of the broad-angle emitted light may be greater than about sixty degrees (e.g., $>\pm60°$).

In some embodiments, the broad-angle emitted light cone angle may be defined to be about the same as a viewing angle of an LCD computer monitor, an LCD tablet, an LCD television, or a similar digital display device meant for broad-angle viewing (e.g., about $\pm40\text{-}65°$). In other embodiments, broad-angle emitted light may also be characterized or described as diffuse light, substantially diffuse light, non-directional light (i.e., lacking any specific or defined directionality), or as light having a single or substantially uniform direction.

Herein 'polarity inversion' and more particularly 'polarity inversion protocol' refers to a configuration of drive signal polarity switching used to drive an array of light valves. For example, according to a polarity inversion protocol as defined herein, a first light valve may be driven using a positive drive signal or stimulus (e.g., a positive drive voltage V+) during a first time interval, while a second light valve may be driven using a negative drive signal or stimulus (e.g., a negative drive voltage V−) during the first time interval. Subsequently, during a second time interval, the first light valve may be driven by a negative drive signal or stimulus (e.g., V−) and the second light valve may be driven by a positive drive signal or stimulus (e.g., V+), according to the polarity inversion protocol. Further, the first and second time intervals may alternate in time to provide the positive and negative drive signals equally to the respective first and second light valves as a function of time. Further, the polarity inversion protocol may describe a pattern of polarity inversion across an array of light valves, by definition herein. Examples of the polarity inversion patterns including, but are not limited to, line inversion (e.g., row inversion, column inversion, etc.) and dot inversion patterns. Polarity inversion or polarity switching may be used to mitigate detrimental effects of switching various light valve types, while the polarity inversion protocol may be used to mitigate or even eliminate flicker in a display based on these light valves, for example. In particular, polarity inversion may be configured to average an apparent brightness level of a particular light valve in each of the different polarity states of the polarity inversion, for example.

Further, as used herein, the article 'a' is intended to have its ordinary meaning in the patent arts, namely 'one or more'. For example, 'a multiview pixel' means one or more multiview pixels and as such, 'the multiview pixel' means 'multiview pixel(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
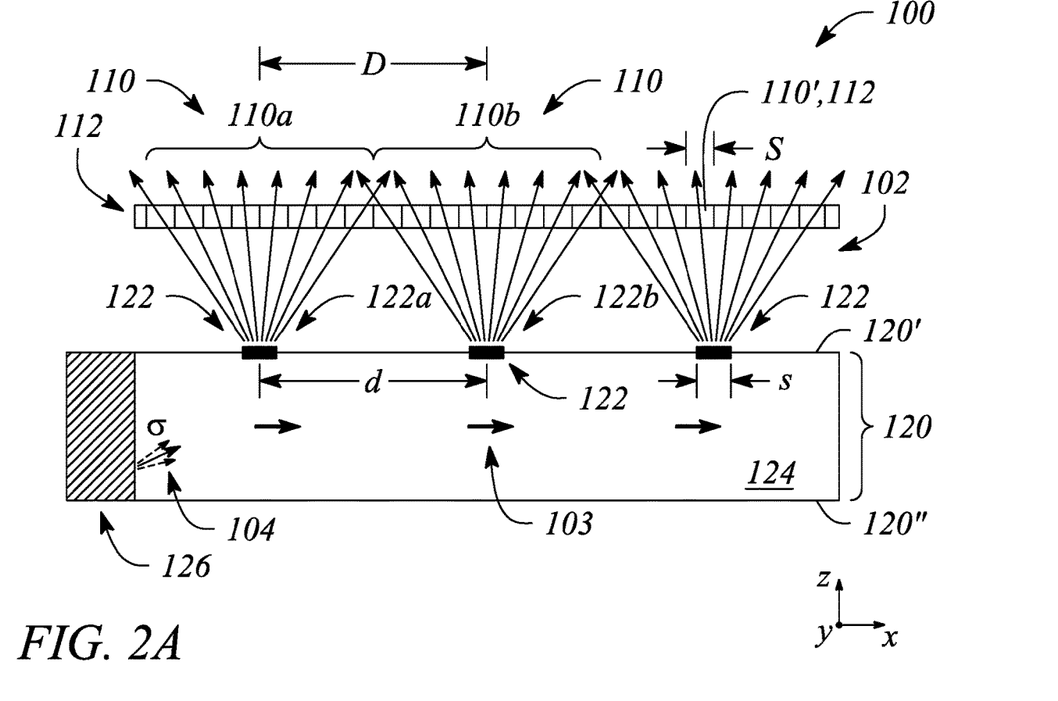
FIG. 2A illustrates a cross-sectional view of a multiview display in an example, according to an embodiment consistent with the principles described herein.
Figure 2B:
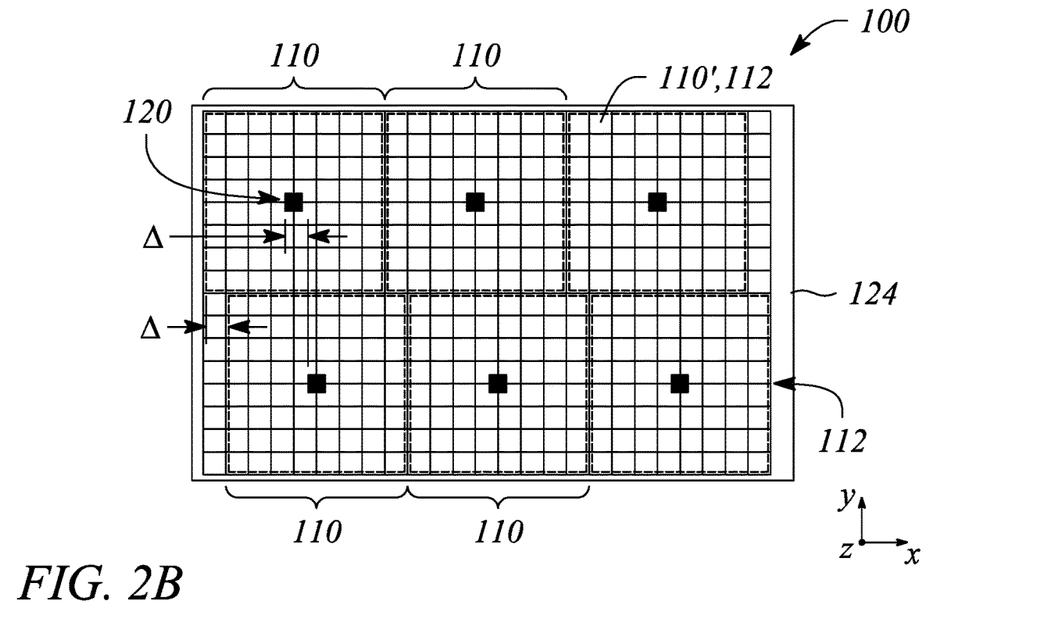
FIG. 2B illustrates a plan view of a multiview display in an example, according to an embodiment consistent with the principles described herein.
Figure 3:
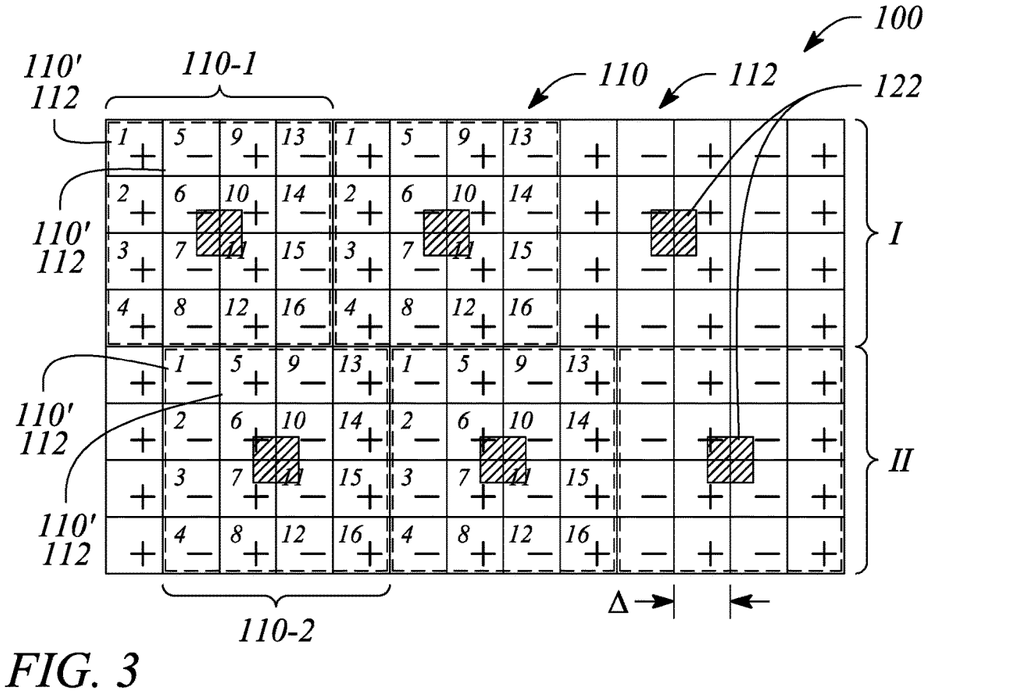
FIG. 3 illustrates a plan view of a portion of a multiview display in an example, according to an embodiment consistent with the principles described herein.

According to some embodiments of the principles described herein, a multiview display is provided. FIG. 2A illustrates a cross-sectional view of a multiview display 100 in an example, according to an embodiment consistent with the principles described herein. FIG. 2B illustrates a plan view of the multiview display 100 in an example, according to an embodiment consistent with the principles described herein. FIG. 3 illustrates a plan view of a portion of a multiview display 100 in an example, according to an embodiment consistent with the principles described herein.

The multiview display 100 illustrated in FIGS. 2A-2B comprises an array of multiview pixels 110. The multiview pixels 110 of the multiview pixel array are configured to provide a plurality of different views of the multiview display 100. According to various embodiments, the array of multiview pixels 110 comprises light valves 112. In particular, a multiview pixel 110 of the multiview pixel array comprises a set of light valves 112 and a view pixel 110' of the multiview pixel 110 corresponds to a light valve 112 of the set of light valves 112 that make up the multiview pixel 110, e.g., as illustrated. In various embodiments, different types of light valves may be employed as light valves 112 of the multiview pixel array including, but not limited to, liquid crystal light valves, electrophoretic light valves, and light valves based on electrowetting. As will be further explained below, a light valve 112 of the array is configured to modulate a directional light beam corresponding to a view direction of the multiview display 100. Multiview pixels 110 are delineated in FIGS. 2B and 3 using dashed lines.

In various embodiments, the light valves 112 of the multiview pixel array are configured to be driven according to a polarity inversion protocol. In particular, FIG. 3 illustrates a portion of the multiview display 100 that includes several multiview pixels 110 of the multiview pixel array along with correspond light valves 112 driven according to a polarity inversion protocol. As illustrated in FIG. 3, a positive polarity is indicated by the (+) symbol, whereas a negative polarity is indicated by a (−) symbol. The light valves 112 of the multiview pixel array may be driven according to any of a number of polarity inversion protocols. For example, the light valves 112 may be driven by a so-called line inversion protocol in which adjacent lines of light valves 112 are driven using polarities that are opposite one another. In some embodiments, the line inversion protocol may be implemented along or with respect to rows of the light valves 112 and therefore may be referred a 'row' inversion protocol, for example. In other embodiments, the line inversion protocol may be implemented along or with respect to columns of the light valves 112 and therefore may be referred to as a 'column' inversion protocol, for example. In yet other embodiments, the inversion protocol of the light valves 112 may be include the light valves 112 being driven according to another inversion scheme including, but not limited to, a so-called 'dot' inversion protocol and a 2-line inversion protocol (pairs of adjacent lines with the same polarity) as well as various combinations of different inversion protocols. As illustrated in FIG. 3, the light valves 112 are depicted as being driven according to a line inversion protocol and specifically according to a column inversion protocol, by way of example and not limitation.

According to various embodiments, the polarity inversion protocol may be configured to mitigate polarization or other polarity induced effects related to switching of the light valves 112. For example, when the light valves 112 comprise a liquid crystal material as a switching medium, the polarity inversion protocol may mitigate or even prevent polarization of the liquid crystal material of the light valves 112. In particular, light valves 112 which include a liquid crystal material (i.e., liquid crystal light valves) that are subjected to a drive signal (e.g., electric field) having a single polarity (e.g., drive signal comprising one of either a positive polarity or a negative polarity) during operation may develop ion drift or similar issues over time. The periodic inversion of the polarity of the light valve 112 comprising the liquid crystal material may reduce an incidence as well as a severity of such ion drift and therefore increase a useable life of the light valve 112 based on liquid crystals. Likewise, polarity inversion may also be useful in mitigation polarity induced affects in light valves 112 that are based on other technologies including, but not limited to, electrophoretic light valves and electrowetting light valves.

Referring back to FIG. 2A, the multiview display 100 further comprises a multibeam backlight 120. The multibeam backlight 120 is configured to provide directional light (e.g., as directional light beams) to the array of multiview pixels 110 comprising the light valves 112. The multibeam backlight 120 may be shaped as a 'slab' or substantially flat block of substrate comprising two substantially parallel and opposite planar surfaces (i.e., a top and a bottom surface). According to various embodiments, the multibeam backlight 120 comprises a plurality of multibeam emitters 122 arranged in rows. In some embodiments, the multibeam emitters 122 of the plurality may be located at or adjacent to a first (or top) surface 120' of the multibeam backlight 120 adjacent to the array of multiview pixels 110, e.g., as illustrated in FIG. 2A. In other embodiments (not illustrated), the plurality of multibeam emitters 122 may be located on a second or back surface 120" of the multibeam backlight 120 (i.e., a surface that is opposite to the first surface 120'). In yet other embodiments, the multibeam emitters 122 of the multibeam element plurality may be located inside the multibeam backlight 120 between the first surface 120' and the second surface 120".

According to various embodiments, a multibeam emitter 122 of the multibeam emitter plurality is configured to provide to a corresponding multiview pixel 110 of the multiview pixel array a plurality of directional light beams 102 having principal angular directions (i.e., the directional light). The different principal angular directions of the plurality of directional light beams 102 correspond to respective different view directions of the multiview display 100, according to various embodiments. In particular, FIG. 2A illustrates the directional light beams 102 as a plurality of diverging arrows depicted directed away from the first (or top) surface 120' of the multibeam backlight 120, by way of example and not limitation.

According to various embodiments, the multibeam emitters 122 of the multibeam emitter plurality may be spaced apart from one another. In particular, the multibeam emitters 122 of the multibeam emitter plurality may be spread apart across a surface of the multibeam backlight 120 in a plurality of rows that are parallel to one another. In addition, the multibeam emitters 122 of the multibeam emitter plurality may be separated from one another by a finite space and represent individual, distinct elements along each of the rows. That is, by definition herein, multibeam emitters 122 of the multibeam emitter plurality are spaced apart from one another according to a finite (i.e., non-zero) inter-emitter distance (e.g., a finite center-to-center distance) within the rows, that are likewise separated from one another, by definition. Further, the multibeam emitters 122 of the multibeam emitter plurality generally do not intersect, overlap or otherwise touch one another, either within the rows or between adjacent rows, according to some embodiments.

The multiview display 100 illustrated in FIG. 3 provides sixteen different views arranged in a four-by-four (4×4) view configuration, by way of example and not limitation. That is, a multiview pixel 110 of the multiview display 100 provides a four-by-four array of views (i.e., 16 views) and thus includes sixteen view pixels 110', each view pixel 110' corresponding to a different light valve 112 of the light valves 112 in the multiview pixel array. As such, each of the view pixels 110' corresponds to a different view of the multiview display 100 or equivalently of a multiview image displayed on the multiview display 100. Further, the array of multiview pixels 110 and equivalently the light valves 112 thereof are driven according to a line inversion protocol along columns of the light valves 112, as illustrated in FIG. 3.

Further, as illustrated in FIG. 3, the multibeam emitters 122 of the array of multibeam emitters 122 are visible through the array of multiview pixels 110. A relationship between the multibeam emitters 122 of the multibeam emitter plurality and corresponding multiview pixels 110 (e.g., sets of light valves 112) may be a one-to-one relationship. That is, there may be an equal number of multiview pixels 110 and multibeam emitters 122, in some embodiments. FIGS. 2B and 3 explicitly illustrate, by way of example, the one-to-one relationship where each multiview pixel 110 comprising a different set of light valves 112 is illustrated as delimited by a thicker line and each multiview pixel 110 corresponds to a single one of the illustrated multibeam emitters 122. Note that FIG. 3 also includes labels (e.g., '1', '2', '3', . . . ) corresponding to numbered views of the multiview image or equivalently of the multiview display 100.

Referring to FIG. 3, a location of the multibeam emitters 122 along a second row II is offset in a row direction relative to a location of multibeam emitters 122 along a first row I. That is, a location of multibeam emitters 122 of the second row II is offset from a corresponding location of multibeam emitters 122 of the first row I by an offset distance $\Delta$, the offset distance $\Delta$ being in the row direction, as illustrated in FIG. 3. Further, because of the one-to-one relationship between multibeam emitters 122 and multiview pixels 110, the multiview pixels 110 of the first row I and the second row II are also offset from each other. Note that in FIG. 2B, the multiview pixels 110 of the first and second rows I, II are also offset by the offset distance $\Delta$ due to the correspondence between multibeam emitters 122 and multiview pixels 110. As a result, view pixels 110' corresponding to the same view number do not share the same columns between the first row I and the second row II. For example, a view pixel 110' corresponding to a view '1' in a first multiview pixel 110-1 is not in the same column light valves 112 as another view pixel 110' corresponding to the view '1' in a second multiview pixel 110-2. Similarly, a view pixel 110' corresponding to a view '5' in the first multiview pixel 110-1 is not in the same column of light valves 112 as another view pixel 110' corresponding to the view '5' in the second multiview pixel 110-2.

According to some embodiments, the offset distance $\Delta$ of a location of the multibeam emitters 122 along the second row II relative to the multibeam emitters of the first row I is an integer multiple of a distance between repeating polarities of the polarity inversion protocol along the row direction. For example, as illustrated in FIG. 3, a line inversion protocol (column inversion) produces a repeating polarity for every other view pixel 110' or equivalently ever other light valve 112 along a row or in the row direction. That is, polarities (+/−) alternate from one view pixel 110' or a light valve 112 to the next along the row or in the row direction, as illustrated. Accordingly, the distance between repeating polarities of the polarity inversion protocol is the size of a view pixel 110' or light valve 112, as illustrated. Further, the offset distance $\Delta$ of a location of multibeam emitters 122 along the second row II relative to the multibeam emitters 122 of the first row I may be an integer multiple of a size of a view pixel 110' or a light valve 112. As illustrated in FIG. 3, the multibeam emitters 122 of the second row I are thus offset from the multibeam emitters 122 of the first row I by a view pixel 110' in the row direction by the offset distance $\Delta$.

According to various embodiments, the offset distance $\Delta$ between the first row I and second row II may be configured to provide a selected directional light beam from each of the first multiview pixel 110-1 and the second multiview pixel 110-2 having a different light valve polarity of a corresponding light valve 112, according to the polarity inversion method. That is, for a given view pixel 110' corresponding to particular view (e.g., view 1 or view 5), the light valve polarity in the first multiview pixel 110-1 differs from that in the second multiview pixel 110-2. For example, the light valve polarity of the view pixel 110' in the multiview pixel 110-1 (e.g., corresponding to view 1 or view 5) of the first row I differs from the light valve polarity of the corresponding view pixel 110' (e.g., corresponding to view 1 or view 5) of the second multiview pixel 110-2 in the second row II. In particular, the light valve 112 corresponding to view 1 of the first multiview pixel 110-1 has a positive polarity (+), whereas the light valve 112 corresponding to view 1 of the adjacent second multiview pixel 110-2 has a negative polarity (−), as illustrated in FIG. 3. The offset distance $\Delta$ between the first row I and the second row II of multibeam emitters 122 or of multiview pixels 110 (due to the one-to-one relationship between multibeam emitters 122 and their corresponding multiview pixels 110) of the multiview display 100 may be repeated across the multiview display 100 in a variety of different patterns, according to various embodiments.

Figure 4A:
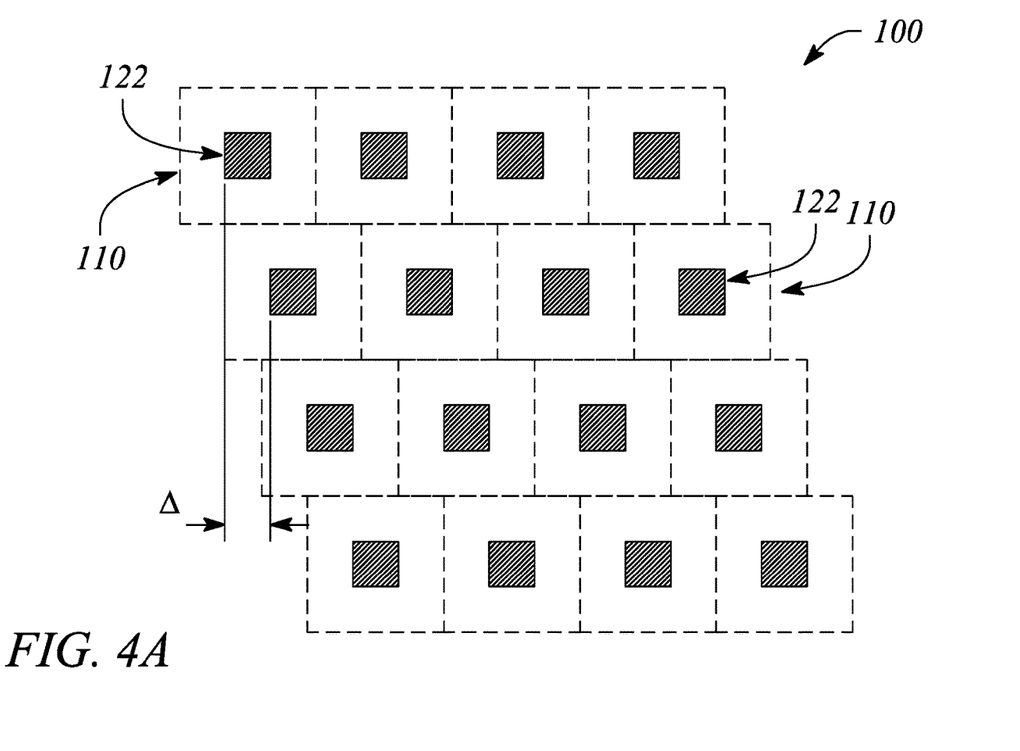
FIG. 4A illustrates a plan view of an offset pattern of a multiview display in an example, according to an embodiment consistent with the principles disclosed herein.
Figure 4B:
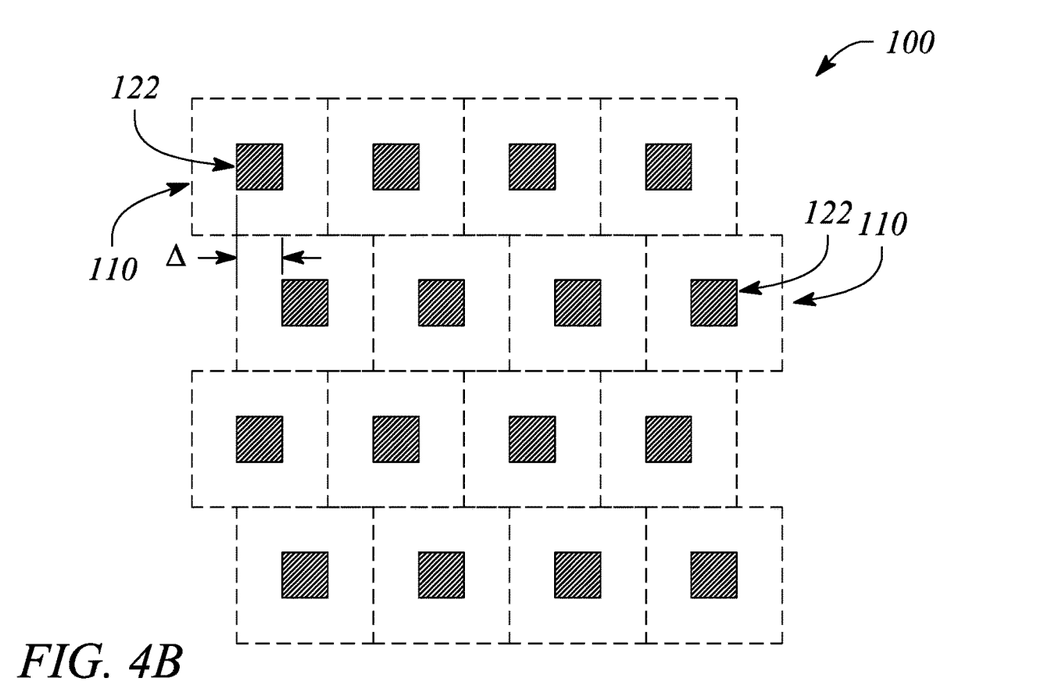
FIG. 4B illustrates a plan view of an offset pattern of a multiview display in an example, according to another embodiments consistent with the principles described herein.

FIG. 4A illustrates a plan view of an offset pattern of a multiview display 100 in an example, according to an embodiment consistent with the principles disclosed herein. FIG. 4B illustrates a plan view of an offset pattern of a multiview display 100 in an example, according to another embodiments consistent with the principles described herein. As illustrated in FIGS. 4A and 4B, each square represents a particular multibeam emitter 122 corresponding to a particular multiview pixel 110. The first and second rows of multibeam emitters 122 (and by extension multiview pixels 110 delineated by dashed lines) are adjacent and offset in the row direction by the offset distance $\Delta$, e.g., a width of a light valve 112, as illustrated. Further, in FIG. 4A, a third row of multibeam emitters 122 is adjacent to the second row and offset therefrom by the offset distance $\Delta$ in the same direction as the second row of multibeam emitters 122. Further, as illustrated, a fourth row adjacent to the third row is offset from the third row in the same direction, and so on. Offset patterns repeat differently in FIG. 4B. There, in a sequence of consecutively numbered rows of multibeam emitters 122 or equivalently, multiview pixels 110, a first, third, fifth row, and so on, are aligned with one another (i.e., not offset), whereas a second, fourth, and sixth row, are offset from the first, third, and fifth rows respectively in the row direction by the offset distance $\Delta$. As such, even rows and odd rows are offset from one another in the row direction, as illustrated in FIG. 4B.

Referring again to FIG. 2A, a size of the multibeam emitter 122 may be comparable to a size of a light valve 112 (or equivalently, of a view pixel 110' in a multiview pixel 110) of the multiview display 100, in some embodiments. Herein, the 'size' may be defined in any of a variety of manners to include, but not be limited to, a length, a width or an area. For example, the size of a light valve 112 may be a length thereof and the comparable size of the multibeam emitter 122 may also be a length of the multibeam emitter 122. In another example, size may refer to an area such that an area of the multibeam emitter 122 may be comparable to an area of the light valve 112.

In some embodiments, the size of the multibeam emitter 122 is comparable to the light valve size such that the multibeam emitter size is between about fifty percent (50%) and about two hundred percent (200%) of the light valve size. For example, if the multibeam emitter size is denoted 's' and the light valve size is denoted 'S' (e.g., as illustrated in FIG. 2A), then the multibeam emitter size s may be given by equation (1) as $$\frac{1}{2}S \leq s \leq 2S \quad (1)$$

In other examples, the multibeam emitter size is greater than about sixty percent (60%) of the light valve size, or about seventy percent (70%) of the light valve size, or greater than about eighty percent (80%) of the light valve size, or greater than about ninety percent (90%) of the light valve size, and the multibeam emitter 122 is less than about one hundred eighty percent (180%) of the light valve size, or less than about one hundred sixty percent (160%) of the light valve size, or less than about one hundred forty (140%) of the light valve size, or less than about one hundred twenty percent (120%) of the light valve size. For example, by 'comparable size', the multibeam emitter size may be between about seventy-five percent (75%) and about one hundred fifty (150%) of the light valve size. In another example, the multibeam emitter 122 may be comparable in size to the light valve 112 where the multibeam emitter size is between about one hundred twenty-five percent (125%) and about eighty-five percent (85%) of the light valve size. According to some embodiments, the comparable sizes of the multibeam emitter 122 and the light valve 112 may be chosen to reduce, or in some examples to minimize, dark zones between views of the multiview display, while at the same time reducing, or in some examples minimizing, an overlap between views of the multiview display.

In some embodiments, a shape of the multibeam emitter 122 is comparable to a shape of the multiview pixel 110 or equivalently, a shape of a set (or sub-array) of the light valves 112 corresponding to the multiview pixel 110. For example, the multibeam emitter 122 may have a square shape and the multiview pixel 110 (or an arrangement of a corresponding set of light valves 112) may be substantially square, as illustrated in FIG. 2B. In another example, the multibeam emitter 122 may have a rectangular shape, i.e., may have a length or longitudinal dimension that is greater than a width or transverse dimension. In this example, the multiview pixel 110 (or equivalently the arrangement of the set of light valves 112) corresponding to the multibeam emitter 122 may have an analogous rectangular shape. In yet other examples (not illustrated), the multibeam emitters 122 and the corresponding multiview pixels 110 have various shapes including or at least approximated by, but not limited to, a triangular shape, a hexagonal shape, and a circular shape.

Further, a distance between adjacent multibeam emitters 122 in the multibeam emitter plurality may be commensurate with a distance between adjacent multiview pixels 110. In some embodiments, an inter-emitter distance (e.g., center-to-center distance) between a pair of adjacent multibeam emitters 122 of the plurality may be equal to an inter-pixel distance (e.g., a center-to-center distance) between a corresponding adjacent pair of multiview pixels 110, e.g., represented by light valve sets. For example, as illustrated in FIG. 2B, a center-to-center distance d between a first multibeam emitter 122a and a second multibeam emitter 122b is substantially equal to a center-to-center distance D between a first light valve set 112a and a second light valve set 112b of adjacent multiview pixels 110. In other embodiments (not illustrated), the relative center-to-center distances of pairs of multibeam emitters 122 and corresponding light valve sets may differ, e.g., the multibeam emitters 122 may have an inter-emitter spacing (i.e., center-to-center distance d) that is one of greater than or less than a spacing (i.e., center-to-center distance D) between light valve sets representing multiview pixels 110.

With further reference to FIG. 2A, in some embodiments, the multibeam backlight 120 may further comprise a light guide 124. The light guide 124 is configured to guide light along a length of the light guide as guided light 104 (i.e., a guided light beam). For example, the light guide 124 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 124, for example.

In some embodiments, the light guide 124 may be a slab or plate optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 124 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 124 may further include a cladding layer (not illustrated) on at least a portion of a surface (e.g., one or both of the first surface and the second surface) of the light guide 124. The cladding layer may be used to further facilitate total internal reflection, according to some examples.

Further, according to some embodiments, the light guide 124 is configured to guide the guided light 104 according to total internal reflection at a non-zero propagation angle between opposing surfaces of the light guide 124. In particular, the guided light 104 propagates by reflecting or 'bouncing' between the surfaces of the light guide 124 at the non-zero propagation angle. In some embodiments, a plurality of guided light beams of the guided light 104 comprising different colors of light may be guided by the light guide 124 at respective ones of different color-specific, non-zero propagation angles. Note, the non-zero propagation angle is not illustrated in FIG. 2A for simplicity of illustration. However, a bold arrow depicting a propagation direction 103 illustrates a general direction of propagation of the guided light 104 along the light guide length in FIG. 2A.

In some embodiments, the multibeam emitter 122 of the multiview display 100 comprises a multibeam element. The multibeam element of the multibeam emitter 122 is configured to scatter out light from the light guide 124 as the plurality of directional light beams 102 having principal angular directions corresponding to view directions of a multiview image or equivalently of the multiview display 100. According to various embodiments, the multibeam element may comprise any of a number of different structures configured to scatter out a portion of the guided light 104. For example, the different structures may include, but are not limited to, diffraction gratings, micro-reflective elements, micro-refractive elements, or various combinations thereof. In some embodiments, the multibeam element comprising a diffraction grating is configured to diffractively scatter out the guided light portion as the plurality of directional light beams having the different principal angular directions. In other embodiments, the multibeam element comprising a micro-reflective element is configured to reflectively scatter out the guided light portion as the plurality of directional light beams, or the multibeam element comprising a micro-refractive element is configured to scatter out the guided light portion as the plurality of directional light beams by or using refraction (i.e., refractively scatter out the guided light portion).

In some embodiments (e.g., as illustrated in FIG. 2A), the multiview display 100 may further comprise a light source 126. According to various embodiments, the light source 126 is configured to provide the light to be guided within light guide 124. In particular, the light source 126 may be located adjacent to an entrance surface or end (input end) of the light guide 124. In various embodiments, the light source 126 may comprise substantially any source of light (e.g., optical emitter) including, but not limited to, one or more light emitting diodes (LEDs) or a laser (e.g., laser diode). In some embodiments, the light source 126 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 126 may be a substantially broadband light source configured to provide substantially broadband or polychromatic light. For example, the light source 126 may provide white light. In some embodiments, the light source 126 may comprise a plurality of different optical emitters configured to provide different colors of light. The different optical emitters may be configured to provide light having different, color-specific, non-zero propagation angles of the guided light corresponding to each of the different colors of light.

In some embodiments, the guided light 104 may be collimated or equivalently may be a collimated light beam (e.g., provided by a collimator, as described below). Herein, a 'collimated light' or 'collimated light beam' is generally defined as a beam of light in which rays of the light beam are substantially confined to a predetermined or defined angular spread within the light beam (e.g., the guided light 104). Further, rays of light that diverge or are scattered from the collimated light beam are not considered to be part of the collimated light beam, by definition herein. Moreover, the guided light 104 may be collimated according to or having a collimation factor σ, in various embodiments.

In other embodiments (not illustrated), the multibeam emitter 122 may comprise an active optical emitter. Herein an 'active' optical emitter is an optical emitter configured to generate light when activated (e.g., when a voltage or electrical current is applied to the active optical emitter). Optical emitters that may be used as multibeam emitters 122 may include, but are not limited to, a micro light emitting diode (μLED), an organic light emitting diode (OLED), and similar light emitting structures. When the multibeam emitter 122 comprises an optical emitter, the multibeam backlight 120 may not include a light guide 124 or light source 126, for example. Instead, the multibeam backlight 120 may comprise a substrate configured to support the multibeam emitters 122 comprising active optical emitters. The substrate may be transparent or substantially transparent, in some embodiments.

Figure 5:
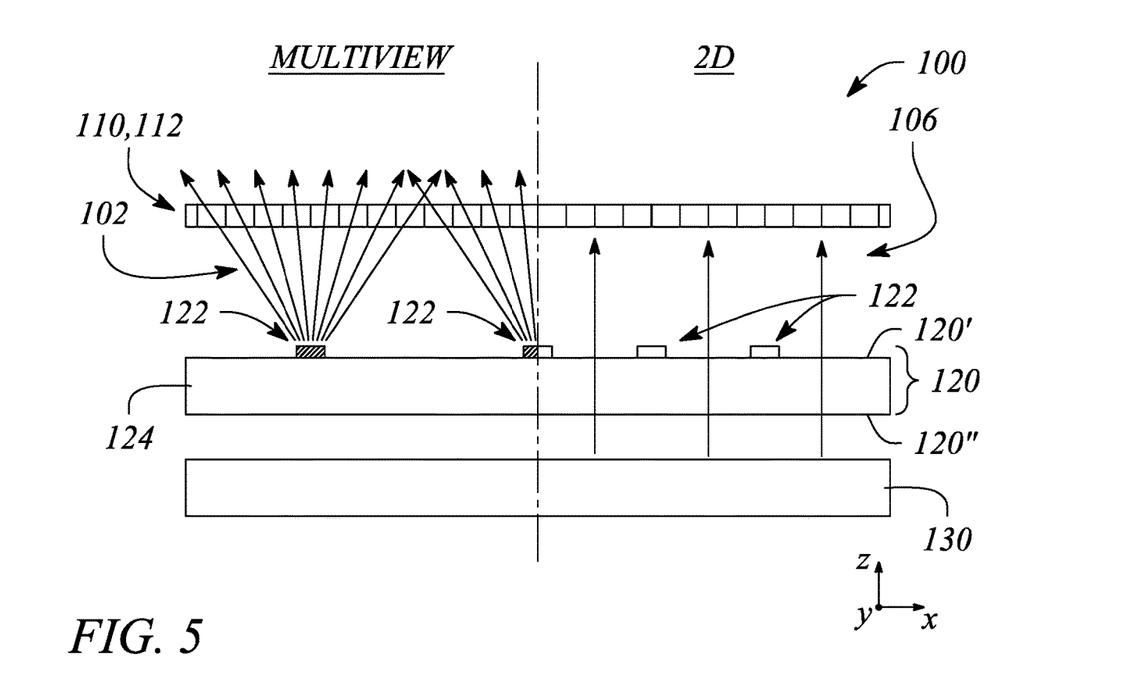
FIG. 5 illustrates a cross-sectional view of a multiview display in an example, according to another embodiment consistent with the principles described herein.

According to some embodiments consistent with the principles described herein, the multiview display 100 may further comprise a broad-angle backlight adjacent to the multibeam backlight 120. The broad-angle backlight may be used to facilitate displaying a 2D image in a two-dimensional (2D) mode, while the multibeam backlight 120 may be used to display a multiview image in a multiview mode, for example. FIG. 5 illustrates a cross-sectional view of a multiview display 100 in an example, according to another embodiment consistent with the principles described herein. In some embodiments, the multiview display 100 illustrated in FIG. 5 may be substantially similar to the multiview display 100 described above, except for the addition of the broad-angle backlight.

In particular, FIG. 5 illustrates the multiview display 100 comprising the light valves 112 of the array of multiview pixels 110 along with the multibeam backlight 120 having multibeam emitters 122, as described above. As illustrated, the multibeam backlight 120 further comprises the light guide 124 with the plurality of multibeam emitters 122 located on a surface of the light guide 124 adjacent to the light valves 112, i.e., the first surface 120' of the multibeam backlight 120. The illustrated multiview display 100 of FIG. 5 further comprises a broad-angle backlight 130. The broad-angle backlight 130 is located on a side of the multibeam backlight 120 opposite to the side adjacent to the light valve array. In particular, the broad-angle backlight 130 is adjacent to the second surface 120" of the multibeam backlight 120 opposite to the first surface 120', as illustrated. The broad-angle backlight 130 is configured to provide broad-angle emitted light 106, according to various embodiments.

In the multiview display 100, the multibeam backlight 120 (e.g., including the light guide 124) is configured to be optically transparent to the broad-angle emitted light 106 emitted from the broad-angle backlight 130. In particular, the light guide 124 together with the plurality of multibeam emitters 122 of the multibeam backlight 120 are configured to be optically transparent to the broad-angle emitted light 106 propagating in a direction that is generally from the second surface 120" to the first surface 120' of the multibeam backlight 120. Thus, the broad-angle emitted light 106 may be emitted from the broad-angle backlight 130 and then pass through a thickness of the multibeam backlight 120 (or equivalent through a thickness of the light guide 124). The broad-angle emitted light 106 from the broad-angle backlight 130 may therefore be received through the second surface 120" of the multibeam backlight 120 (or equivalently a second surface of the light guide 124), transmitted through a thickness of multibeam backlight 120 (or equivalently through a thickness of the light guide 124), and then emitted from a first surface 120' of the multibeam backlight 120 (or a first surface of the light guide 124). Since the multibeam backlight 120 is configured to be optically transparent to the broad-angle emitted light 106, the broad-angle emitted light 106 is not substantially affected by the multibeam backlight 120, according to some embodiments.

According to various embodiments, the multiview display 100 of FIG. 5 may selectively operate in the 2D mode (2D) or the multiview mode (Multiview). In the 2D mode, the multiview display 100 is configured to emit the broad-angle emitted light 106 provided by the broad-angle backlight 130. In turn, the broad-angle emitted light 106 may be modulated by the light valves 112 to provide a 2D image during the 2D mode. Alternatively, in the multiview mode, the multiview display 100 is configured to emit the directional light beams 102 provided by the multibeam backlight 120, as previously described. Also as described above, the emitted directional light beams 102 may be modulated by the light valves 112 of the multiview pixels 110 to provide or display a multiview image. As a result, the multibeam backlight 120 and the broad-angle backlight 130, in combination, may be used in dual-mode (2D/3D) display that may be switched between displaying 2D images and multiview images, for example.

Figure 6:
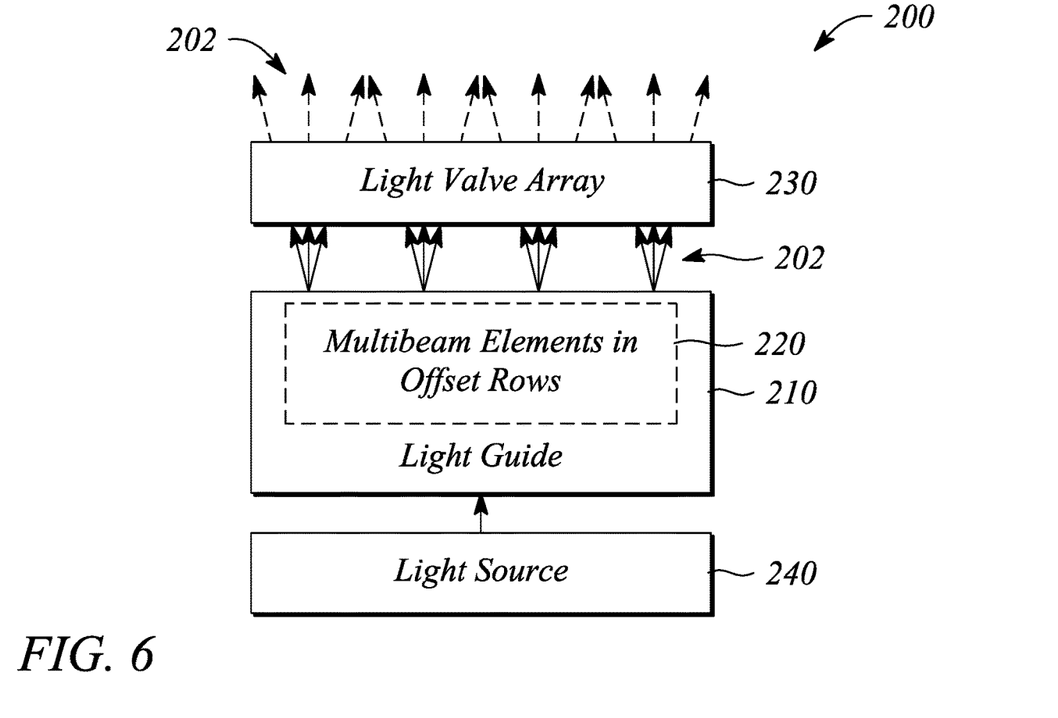
FIG. 6 illustrates a block diagram of a multiview display in an example, in accordance with an embodiment consistent with the principles described herein.

In accordance with some embodiments of the principles described herein, a multiview display 200 is disclosed. FIG. 6 illustrates a block diagram of a multiview display 200 in an example, in accordance with an embodiment consistent with the principles described herein. As illustrated, the multiview display 200 comprises a light guide 210 configured to guide light as guided light. According to various embodiments, the light guide 210 may be configured to guide the guided light using total internal reflection. Further, the guided light may be guided at a non-zero propagation angle by or within the light guide 210. In some embodiments, the light guide 210 may be substantially similar to the light guide 124 of the multiview display 100, previously described. In some embodiments, the guided light may be collimated or may be a collimated light beam. In particular, the guided light may be collimated according to or having a collimation factor σ, in various embodiments.

The multiview display 200 illustrated in FIG. 6 further comprises an array of multibeam elements 220 arranged in rows. According to some embodiments, the multibeam elements 220 of the multibeam element array may be substantially similar to the plurality of multibeam emitters 122 of the above-described multiview display 100. In particular, the array of multibeam elements 220 is configured to scatter out a portion of the guided light as directional emitted light 202 associated with multiview pixels of the multiview display 200. According to various embodiments, the directional emitted light 202 comprises a plurality of directional light beams having principal angular directions corresponding to respective different view directions of the multiview display 200. Further, multibeam elements of the multibeam element array may be located either at a surface of or within the light guide 210, according to various embodiments.

The multiview display 200 further comprises an array of light valves 230. The array of light valves 230 is configured to modulate the directional emitted light 202 to provide a multiview image. Different sets of light valves 230 of the light valve array correspond to different ones of the multiview pixels of the multiview display 200. According to some embodiments, light valves 230 of the array of light valves 230 may be substantially similar to the light valves 112 of the light valve plurality described above with respect to the multiview display 100. For example, the light valves 230 may comprise any of several different types of light valves including, but not limited to, liquid crystal light valves, electrophoretic light valves, and light valves based on electrowetting. Further, the light valves 230 of the light valve array are configured to be driven according to a polarity inversion protocol, in various embodiments. The polarity inversion protocol may be configured to mitigate polarization of the liquid crystal medium of the liquid crystal light valves of the light valve array as well as similar affects in other types of light valves.

According to various embodiments, the array of light valves 230 may be driven according to any number of polarity inversion protocols. For example, the array of light valves 230 may be driven according to a line inversion protocol, in some embodiments. The line inversion protocol may be along a row (row inversion) or a column (column inversion) of the array of light valves 230, for example. In other embodiments, the array of light valves 230 may be driven according to a dot inversion protocol. In still other embodiments, the array of light valves 230 may be driven according to 2-line inversion protocol. In yet other embodiments, the array of light valves 230 may be driven according to various combinations of these inversion protocols.

Further, according to some embodiments, a first row of multibeam elements 220 of the multibeam element array may be offset with respect to a second row of the multibeam elements 220 of the multibeam element array. In some embodiments, the offset may be in a row direction of the array of multibeam elements 220. A size of the offset or offset distance between the first row and the second row of the multibeam elements 220 within the multibeam element array may be an integer multiple of a distance between repeating polarities of a polarity inversion protocol of the light valve array, in some embodiments. For example, when the light valve array is driven according to a dot inversion protocol, a distance between repeating polarities is about a width of a light valve or equivalently a width of a view pixel. Accordingly, the first row and second row of multibeam elements may be offset by a distance of the light valve width, for example.

In some embodiments, the offset between the first and second rows of multibeam elements is configured to mitigate flicker of pixels within the multiview image that may be associated with the polarity inversion protocol of the light valve array. For example, the offset may insure that a directional light beam from a multibeam element 220 of the first row is modulated by a light valve 230 having an opposite or different polarity according to the polarity inversion protocol when compared to a polarity of another light valve 230 that modulates another directional light beam from another multibeam element 220 of the second row. Moreover, when the directional light beams are modulated using the light valves 230 having opposite or different polarities according to the polarity inversion protocol, flicker associated with the polarity switching of the polarity inversion protocol may be mitigated or even eliminated, especially when the directional light beams correspond to adjacent pixels of a view of the multiview image.

In various embodiments, a size of the multibeam element 220 of the multibeam element array may be comparable to a size of a light valve 230 of the light valve array. In some embodiments, the size of the multibeam element 220 is comparable to the light valve size such that the multibeam element size is between about fifty percent (50%) and about two hundred percent (200%) of the light valve size. Further, a shape of a multibeam element 220 may be comparable to a shape of a multiview pixel. For example, the multibeam element 220 may have a square shape and the multiview pixel may be substantially square. In another example, the multibeam element 220 may have a rectangular shape, i.e., may have a length or longitudinal dimension that is greater than a width or transverse dimension, and the multibeam element 220 may be substantially rectangular. Further still, a distance between adjacent multibeam elements 220 in the multibeam element array may be commensurate with a distance between adjacent multiview pixels of the multiview display 200. For example, an inter-element distance (e.g., center-to-center distance) between a pair of adjacent multibeam elements 220 of the multibeam element array may be equal to an inter-pixel distance (e.g., a center-to-center distance) between a corresponding adjacent pair of multiview pixels, e.g., represented by sets of light valves 230 of the light valve array.

In some embodiments, multibeam elements 220 of the multibeam element array may comprise any of a number of different structures configured to scatter out a portion of the guided light. For example, the different structures may include, but are not limited to, diffraction gratings, micro-reflective elements, micro-refractive elements, or various combinations thereof. In some embodiments, a multibeam element 220 comprising a diffraction grating is configured to diffractively scatter out the guided light portion as the plurality of directional light beams having the different principal angular directions. In other embodiments, a multibeam element 220 comprising a micro-reflective element is configured to reflectively scatter out the guided light portion as the plurality of directional light beams, or a multibeam element 220 comprising a micro-refractive element is configured to scatter out the guided light portion as the plurality of directional light beams by or using refraction (i.e., refractively scatter out the guided light portion).

As illustrated in FIG. 6, the multiview display 200 may further comprise a light source 240 optically coupled to an input of the light guide 210, in some embodiments. The light source 240 may be substantially similar to the light source 126 of the multiview display 100, previously described. The light source 240 is configured to provide the light to the light guide 210 to be guided as the guided light. In some embodiments, the light source 240 may be located adjacent to an entrance surface of the light guide 210 and may comprise substantially any source of light, including but not limited to, an LED and a laser. In some embodiments, the light source 240 may comprise a plurality of different optical emitters configured to provide different colors of light. In some embodiments, the light provided by the light source may be collimated or equivalently may be a collimated light beam. Moreover, the light may be collimated according to a collimation factor σ, in various embodiments.

Figure 7:
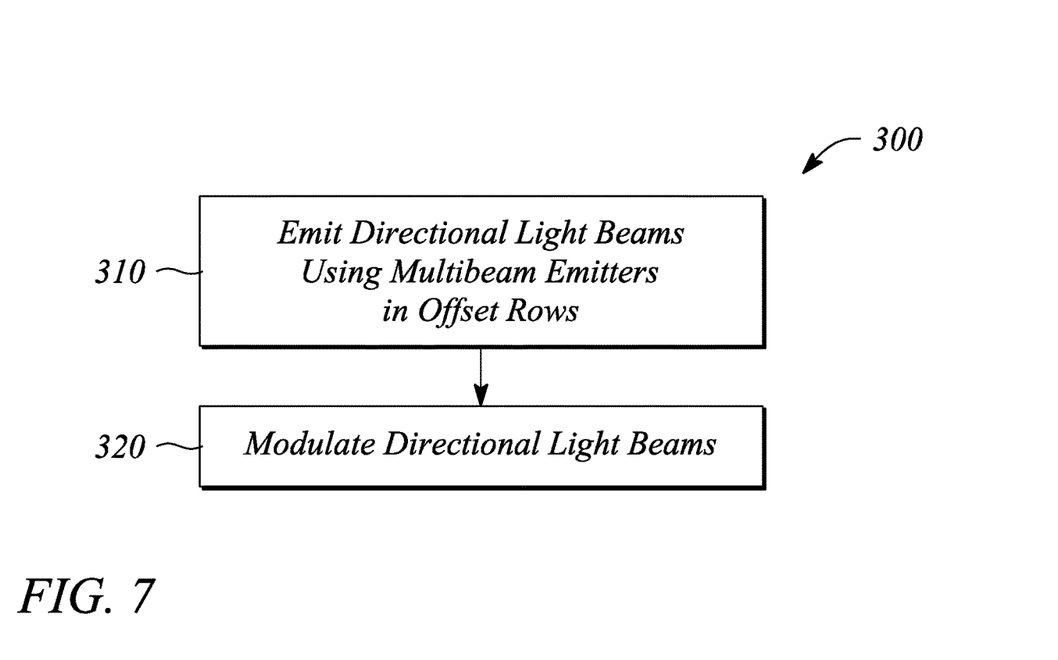
FIG. 7 illustrates a flowchart of a method of multiview display operation in an example, according to an embodiment consistent with the principles herein.

In accordance with some embodiments of the principles described herein, a method 300 of multiview display operation is provided. FIG. 7 illustrates a flowchart of the method 300 of multiview display operation in an example, according to an embodiment consistent with the principles herein. The method 300 of multiview display operation comprises emitting 310 directional light beams using an array of multibeam emitters of a multibeam backlight, multibeam emitters of the multibeam emitter array being arranged in offset rows. For example, the rows of multibeam emitters may be offset in either a direction of a column or a direction of a row of the multibeam emitter array. In some embodiments, the multibeam emitters may be substantially similar to the multibeam emitters 122 of the multibeam element plurality described above with respect to the multiview display 100. Further, the directional light beams have directions corresponding to different views directions of the multiview display, according to various embodiments.

The method 300 further comprises modulating 320 the directional light beams using an array of light valves to display a multiview image. Light valves of the light valve array may be substantially similar to the light valves 112 of the above-described multiview display 100. For example, one or more of liquid crystal light valves, electrophoretic light valves, and electrowetting light valves, among others, may be employed as the light valves of the light valve array to modulate 320 the directional light beams. According to various embodiments, sets of light valves of the light valve array may correspond to multiview pixels of the multiview display. For example, a four-by-four (4×4) set of light valves of the light valve array may correspond to a multiview pixel of the multiview display. Similarly, a light valve of the light valve array may correspond to a view pixel of the multiview pixel, for example.

In various embodiments, the light valve array is driven according to a polarity inversion protocol. As described above, the polarity inversion protocol may be configured to mitigate various affects including, but not limited to, polarization of a liquid crystal medium of the light valves realized as liquid crystal light valves. In various embodiments, the array of light valves may be driven according to any number of polarity inversion protocols. For example, the array of light valves may be driven according to a line inversion protocol. The line inversion protocol may be along a row (row inversion) or a column (column inversion) of the array of light valves, for example. In other examples, the array of light valves may be driven according to either a dot inversion protocol or a 2-line inversion protocol. In yet other examples, the array of light valves may be driven using combinations of these inversion protocols as well as possibly other inversion protocols.

In some embodiments, an offset between rows of multibeam emitters is an integer multiple of a distance between repeating polarities of the polarity inversion protocol along an offset row. For example, in the light valve array driven according to a dot inversion protocol, a distance between repeating polarities is a width of a light valve or equivalently a width of a view pixel. Accordingly, the first row and second row of multibeam elements may be offset by a distance of a light valve width.

In various embodiments, the offset between the offset rows provides a selected directional light beam of each of a first multiview pixel and a second multiview pixel with a different light valve polarity, according to the polarity inversion protocol. For example, a light valve corresponding to a particular view (e.g., view 1) of a multiview pixel may have a positive polarity, whereas a light valve corresponding to the same view in another multiview pixel within an offset row but the same column, may have a negative polarity.

In some embodiments (not illustrated), the multibeam backlight used in the method 300 further comprises a light guide. The light guide may be substantially similar to the light guide 124 of the multiview display 100, for example. In these embodiments, emitting 310 the directional light beams may further comprise guiding light in the light guide as guided light. The light may be guided at a non-zero propagation angle between opposite internal surfaces of the light guide, according to some embodiments. Further, emitting 310 the directional light beams may comprise scattering a portion of the guided light out of the light guide a plurality of directional light beams using a multibeam emitter comprising a multibeam element. The multibeam emitter may be substantially similar to the multibeam emitter 122 of the multiview display 100, described above. As such, the multibeam element of the multibeam emitter may comprise one or more of a diffraction grating configured to diffractively scatter out the portion of the guided light, a micro-reflective structure configured to reflectively scatter out the portion of the guided light, and a micro-refractive structure configured to refractively scatter out the portion of the guided light. In other embodiments, the multibeam element of the multibeam emitter may comprise an active emitter such as, but not limited to, a light emitting diode (LED) and an organic light emitting diode (OLED).

Further, the multibeam emitter may have a size comparable to a size of a light valve of the light valve array. In some embodiments, a size of the multibeam emitter may be comparable to a size of the light valve of the light valve array such that the multibeam element size is between about fifty percent (50%) and about two hundred percent (200%) of the light valve size.

In some embodiments (not illustrated), the method 300 of multiview display operation may further comprise providing light to be guided by the light guide using a light source optically coupled to an input of the light guide. The light source may be substantially similar to the light source 126 of the multiview display 100, described above. In some embodiments, the light source may provide light having a non-zero propagation angle. Further, the light source may provide collimated light, or equivalently light having a having a collimation factor σ, in various embodiments.

Thus, there have been described examples and embodiments of a multiview display and a method of multiview display operation that comprise an array of multiview pixels and multibeam emitters arranged in offset rows. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview display comprising:
an array of multiview pixels comprising light valves configured to be driven according to a polarity inversion protocol; and
a multibeam backlight having a plurality of multibeam emitters arranged in rows, a multibeam emitter of the multibeam emitter plurality being configured to provide to a multiview pixel of the multiview pixel array a plurality of directional light beams having directions corresponding to different view directions of the multiview display,
wherein a location of multibeam emitters along a second row is offset in a row direction relative to a location of multibeam emitters along a first row by an offset distance, the offset distance being an integer multiple of a distance between repeating polarities of the polarity inversion protocol along the row direction.

2. The multiview display of claim 1, wherein the offset distance between the first and second rows is configured to provide a selected directional light beam of each of a first multiview pixel and a second multiview pixel with a different light valve polarity according to the polarity inversion protocol.

3. The multiview display of claim 1, wherein the polarity inversion protocol comprises a column polarity inversion of adjacent columns of light valves within the multiview pixel array.

4. The multiview display of claim 1, wherein a size of the multibeam emitter is between one half of a size of a light valve of the multiview pixel and two times the light valve size.

5. The multiview display of claim 1, wherein one or both of a shape of the multibeam emitter is comparable to a shape the multiview pixel and a distance between adjacent multibeam emitters in the multibeam emitter plurality is commensurate with a distance between adjacent multiview pixels of the multiview pixel array.

6. The multiview display of claim 1, wherein multibeam backlight further comprises a light guide configured to guide light along a length of the light guide as guided light, and wherein the multibeam emitter comprises a multibeam element configured to scatter out a portion of the guided light as the plurality of directional light beams.

7. The multiview display of claim 6, wherein the multibeam elements comprise one or more of a diffraction grating configured to diffractively scatter out the portion of the guided light as the plurality of directional light beams, a micro-reflective structure configured to reflectively scatter out the portion of the guided light as the plurality of directional light beams, and a micro-refractive structure configured to refractively scatter out the portion of the guided light as the plurality of directional light beams.

8. The multiview display of claim 6, further comprising a light source optically coupled to an input of the light guide, the light source being configured to provide the light to the light guide, the guided light one or both of having a non-zero propagation angle and being collimated according to a predetermined collimation factor.

9. The multiview display of claim 1, wherein the light valves of the multiview pixel array comprise liquid crystal light valves, the polarity inversion protocol being configured to mitigate polarization of a liquid crystal medium of the liquid crystal light valves.

10. A multiview display comprising:
a light guide configured to guide light;
an array of multibeam elements arranged in rows and configured to scatter out a portion of the guided light as directional emitted light associated with multiview pixels of the multiview display; and
an array of light valves configured to modulate the directional emitted light to provide a multiview image, different sets of light valves of the light valve array corresponding to different ones of the multiview pixels of the multiview display,
wherein a first row of multibeam elements is offset with respect to a second row of the multibeam elements by an integer multiple of a distance between repeating polarities of a polarity inversion protocol of the light valve array.

11. The multiview display of claim 10, wherein the polarity inversion protocol comprises one of column polarity inversion and dot polarity inversion of the light valve array.

12. The multiview display of claim 10, wherein one or more of a size of the multibeam element is comparable to a size of a light valve of the light valve array, a shape of the multibeam element is comparable to a shape the multiview pixels, and a distance between adjacent multibeam elements in the multibeam element array is commensurate with a distance between adjacent multiview pixels of the multiview display.

13. The multiview display of claim 10, wherein the multibeam elements comprise one or more of a diffraction grating configured to diffractively scatter out the portion of the guided light, a micro-reflective structure configured to reflectively scatter out the portion of the guided light, and a micro-refractive structure configured to refractively scatter out the portion of the guided light.

14. The multiview display of claim 10, further comprising a light source optically coupled to an input of the light guide, the light source being configured to provide the light to the light guide one or both of having a non-zero propagation angle and being collimated according to a predetermined collimation factor.

15. The multiview display of claim 10, wherein the light valves of the light valve array comprising liquid crystal light valves, the polarity inversion protocol being configured to mitigate polarization of a liquid crystal medium of the liquid crystal light valves.

16. The multiview display of claim 10, wherein the offset between the first and second rows of multibeam elements is configured to mitigate brightness flicker of pixels within the multiview image associated with the polarity inversion protocol.

17. The multiview display of claim 10, further comprising a broad-angle backlight adjacent to a side of the light guide opposite to a side of the light guide adjacent to the light valve array, the broad-angle backlight being configured to provide broad-angle emitted light during a two-dimensional (2D) mode of the multiview display, wherein the light guide and multibeam element array are configured to be transparent to the broad-angle emitted light and the directional emitted light is configured to be scattered out selectively during a multiview mode of the multiview display, the multiview display being configured to display the multiview image during the multiview mode and a 2D image during the 2D mode.

18. A method of multiview display operation, the method comprising:
  emitting directional light beams using an array of multibeam emitters of a multibeam backlight, multibeam emitters of the multibeam emitter array being arranged in offset rows; and
  modulating the directional light beams using an array of light valves to display a multiview image, sets of light valves of the light valve array corresponding to multiview pixels of the multiview display and the light valve array being driven according to a polarity inversion protocol,
  wherein an offset distance between offset rows being an integer multiple of a distance between repeating polarities of the polarity inversion protocol along an offset row.

19. The method of multiview display operation of claim 18, wherein the offset distance between the offset rows provides a selected directional light beam of each of a first multiview pixel and a second multiview pixel with a different light valve polarity according to the polarity inversion protocol.

20. The method of multiview display operation of claim 18, wherein the multibeam backlight further comprises a light guide, emitting the directional light beams comprising:
  guiding light in the light guide as guided light; and
  scattering a portion of the guided light out of the light guide as a plurality of directional light beams using a multibeam emitters comprising a multibeam element,
  wherein the multibeam element comprises one or more of a diffraction grating, a micro-reflective structure and a micro-refractive structure, the multibeam element having a size that is comparable to a size of a light valve of the light valve array.

21. The method of multiview display operation of claim 18, further comprising providing light to be guided by the light guide using a light source optically coupled to an input of the light guide, the light source providing the light one or both of having a non-zero propagation angle and being collimated according to a predetermined collimation factor.

* * * * *